United States Patent [19]

Schrader

[11] 4,146,320
[45] Mar. 27, 1979

[54] ADJUSTING AND LATCHING MECHANISM FOR COLLAPSIBLE CAMERA

[75] Inventor: Goetz Schrader, Frankfurt am Main, Fed. Rep. of Germany

[73] Assignee: Plaubel, Feinmechanik & Optik Gesellschaft mit beschrankter Haftung, Frankfurt am Main, Fed. Rep. of Germany

[21] Appl. No.: 831,272

[22] Filed: Sep. 7, 1977

[30] Foreign Application Priority Data

Sep. 8, 1976 [DE] Fed. Rep. of Germany ....... 2640436

[51] Int. Cl.² ............................................. G03B 17/04
[52] U.S. Cl. .................................................. 354/187
[58] Field of Search ................. 354/187, 188, 192–195

[56] References Cited

FOREIGN PATENT DOCUMENTS 454447 12/1924 Fed. Rep. of Germany ........... 354/195
462393 12/1924 Fed. Rep. of Germany ........... 354/195

*Primary Examiner*—John Gonzales
*Attorney, Agent, or Firm*—Montague & Ross

[57] ABSTRACT

A bellows camera has a housing movably connected with its lens mount by a pair of scissor links whose operation is controlled by respective rack members driven by pinions on a common shaft which traverses the housing and carries a focusing-control knob. If the knob is rotated beyond a limiting position of an operating range, corresponding to focusing on infinity, the rack members are decoupled from the scissor links and simultaneously unblock a spring-loaded latch (or a pair of such latches) which is then free to engage a peg on the lens mount upon manual collapsing of the camera. Restoration of the knob to the aforementioned limiting position releases the latch and allows the lens mount to be re-extended by hand or under spring pressure.

5 Claims, 3 Drawing Figures

ADJUSTING AND LATCHING MECHANISM FOR COLLAPSIBLE CAMERA

FIELD OF THE INVENTION

My present invention relates to a photographic camera of the collapsible type whose housing, designed to accommodate a film to be exposed, is connected with a movable lens mount, carrying the exposure objective, through an extendible linkage allowing the distance of the objective from the film plane to be adjusted for focusing purposes by varying the separation of the lens mount from the housing. Generally, a bellows is inserted between the lens mount and the housing to form a lighttight enclosure between the objective and the film chamber.

BACKGROUND OF THE INVENTION

The extendible linkage normally used on such a bellows camera comprises a pair of scissor links or lazy-tongs on opposite sides of its optical axis, e.g. at the top and at the bottom. In my copending application Ser. No. 831,267 of even date, whose disclosure is hereby incorporated by reference into the present application, I have described and claimed a focusing mechanism including a pair of rack-and-pinion transmissions on the camera housing, controlled by a rotatable knob, which coact with the two scissor links throughout a range of operating positions but are decoupled therefrom in an operative position to facilitate a rapid collapsing of the camera. When the control knob is returned to the operating range, i.e. into or past a position corresponding to focusing on infinity, a re-extension of the lens mount automatically recouples the two racks with the respective scissor links.

In such a camera, as well as in others of the same general type, it is desirable to lock the retracted lens mount to the housing in the collapsed state, particularly where a spring force (possibly that of the resilient bellows) urges the lens mount into its extended position. Thus, the camera is ready for use upon unlocking, provided that the control knob has been restored to the operating range from which it was previously displaced for the collapsing of the camera.

OBJECT OF THE INVENTION

The object of my present invention is to provide a focusing mechanism for a camera of this type in which a single actuator, such as the aforementioned knob, controls not only the engagement and disengagement of the linkage but also the locking and unlocking of the retracted lens mount, thus dispensing with the need for any separate manipulation.

SUMMARY OF THE INVENTION

I realize this object, in accordance with my present invention, by the provision of latch means on the camera housing coacting with blocking means on the focusing mechanism so as to be disabled when that mechanism is in its operating range, a displacement of the focusing means beyond that range enabling the latch means to engage the lens mount in its retracted position. In the system disclosed in my above-identified copending application, in which this feature has been described but not claimed, the disablement and the re-enablement of the latch means thus coincide with the engagement and the disengagement, respectively, of the scissor linkage by knob-controlled rack members.

BRIEF DESCRIPTION OF THE DRAWING

The above and other features of my invention will now be described in detail with reference to the accompanying drawing in which.

SPECIFIC DESCRIPTION

Figure 3:
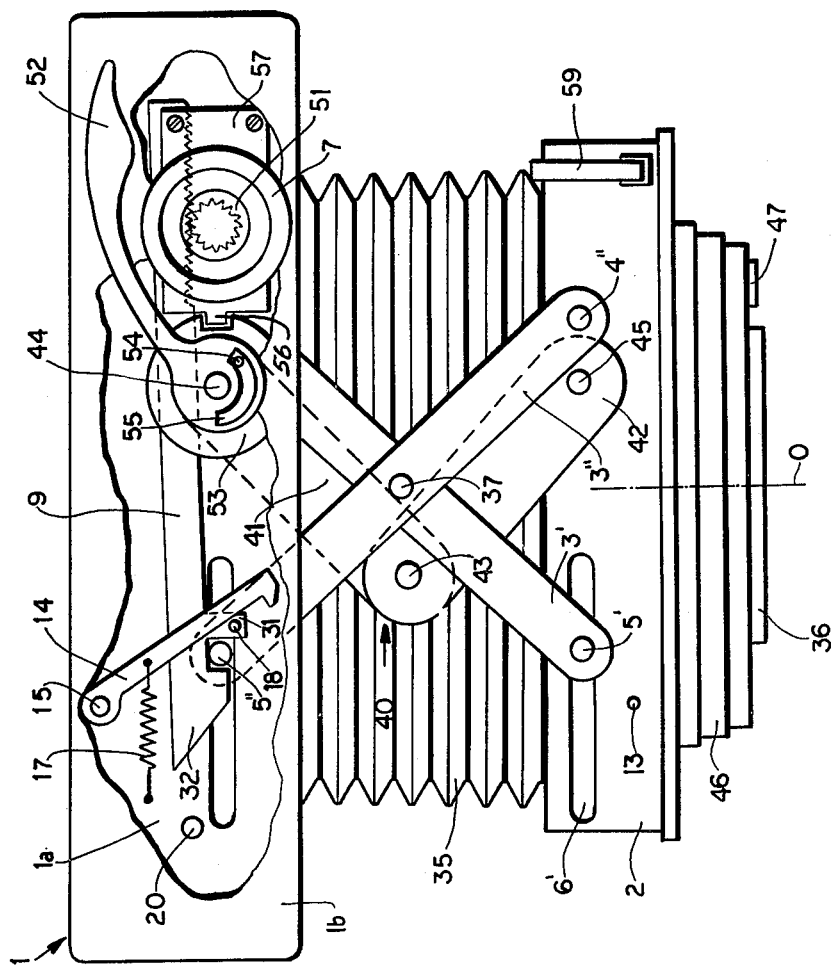
FIG. 3 is a view generally similar to FIG. 2 but showing additional details of the camera.

In the drawing I have shown a collapsible camera comprising a housing 1 and a lens mount 2 interconnected by a bellows 35 as well as by an articulated linkage which includes two pairs (only one shown) of scissor arms 3', 3" pivotally interconnected at 37. Another part of the linkage, shown only in FIG. 3, is a knee joint 40 formed from a pair of legs 41, 42 of equal length interconnected by a hinge pin 43, leg 41 being pivotable on housing 1 about the axis of an input shaft 44 whereas leg 42 is similarly pivotable on lens mount 2 about the axis of an output shaft 45. The legs of knee joint 40 serve as carriers for a gear train forming part of a mechanical transmission for the operation of a shutter associated with an objective 36 whose optical axis is shown at 0 and which is disposed on a lens board 46 also accommodating a window 47 for an electric eye of a photometer. The construction of the knee joint 40 and of the associated gear train is described and illustrated in my copending application Ser. No. 831,279 of even date whose disclosure is hereby likewise incorporated by reference into the present application.

Arms 3', 3" constitute a scissor link forming one section of an articulated linkage inserted above axis 0 between housing 1 and lens mount 2, a nonillustrated replica of that scissor link being disposed on the bottom of the camera below bellows 35. Arm 3' has one end articulated to housing 1 by a pivot pin 4' and carries at its opposite end a pin 5' which is slidable in a guide slot 6' of lens mount 2. In an analogous manner, arm 3" has one end articulated to lens mount 2 by a pivot pin 4" and carries at its opposite end a pin 5" slidable in a guide slot 6" of housing 1.

A vertical shaft 30 traverses the housing 1, at a location laterally offset from optical axis 0, and carries at its top a focusing knob 7 serving to control the scissor linkage 3', 3". Shaft 30 is provided at its top and bottom extremities with a pair of pinions 8 meshing with respective rack members 9 which are provided with teeth 10 over part of their length and are slidable along upper and lower walls 1a of housing 1. It is to be noted that these walls lie within an external envelope 1b which is partly shown in FIG. 3 and has not been illustrated otherwise. Only the upper one of the two identical rack-and-pinion transmissions 8-10 is visible in the drawing.

Figure 1:
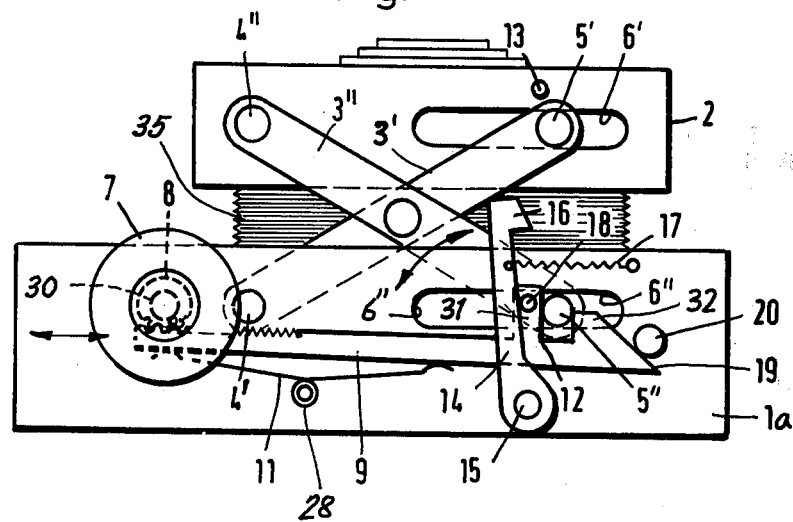
FIG. 1 is a diagrammatic plan view of a bellows camera provided with a focusing and latching mechanism according to my invention, the camera being shown in an operating position.

An untoothed end of rack 9 remote from pinion 8 carries a pair of prongs 31 and 32 separated by a gap 12 fitting closely about the pin 5" guided in slot 6" of wall 1a. A hairpin spring 11, embracing a fixed stud 28, bears upon the back of rack 9 at two locations, i.e. opposite its point of contact with pinion 8 and in the vicinity of prong 31. With lens mount 2 extended as shown in FIGS. 1 and 3, the camera is in operating position and can be focused upon objects at distances ranging from infinity to closeup. Within that operating range, rack 9 lies parallel to slot 6" as well as to the major sides of housing 1 and is positively coupled with scissor arm 3" via pin 5". The movement of the rack is determined solely by its contact with pinion 8, pin 5" and spring 11; thus, the rack is free to swing out laterally against the spring force upon reaching the right-hand limit of its stroke when a stud 20 on housing wall 1a strikes a camming edge 19 forming the outer flank of prong 32 to deflect the rack from its linear path. Such deflection, illustrated in FIG. 2, decouples the arm 3" from the rack 9 by removing the shorter prong 32 from registry with slot 6", the longer prong 31 continuing to span that slot so as to prevent the pin 5" from moving to the left to gap 12 as viewed in FIGS. 1 and 2. As indicated by an arrow 25, pin 5" can now travel freely within the right-hand section of slot 6" to allow the complete collapse of the camera, with retraction of lens mount 2 into the housing 1. This retraction of the lens mount can be carried out rapidly by hand, possibly against the resiliency of the bellows 35 and/or the force of a nonillustrated compression spring tending to re-extend the lens mount.

A latch 14, fulcrumed at 15 on the internal housing wall 1a, serves to hold the lens mount withdrawn by engaging a coacting peg 13 thereon; as long as the rack 9 occupies the operating position of FIG. 1, the latching mechanism is disabled by a projection 18 on prong 31 which blocks the clockwise swing of the latch under the control of a biasing spring 17 into its locking position. This mechanism may be identically duplicated at the bottom side of the camera.

Knob 7, rotatable with shaft 30 over an arc of more than 180°, may be formed with a peripheral notch releasably engageable by an indexing spring at the instant when the camera is focused on infinity, i.e. just before the stud 20 begins to decouple the rack 9 from the pin 5". Thus, the user will know that the limit of the operating range has been reached but will nevertheless be able to go beyond that range by overcoming the force of the indexing spring. At the opposite or closeup end of the range, further clockwise rotation of knob 7 is prevented by a fixed stop or by the engagement of pin 5" with the left-hand end of slot 6".

As further illustrated in FIG. 3, a pushbutton 51 is axially seated within knob 7 to serve as a trigger for the release of the shutter after the same has been cocked with the aid of a wind-up lever 52 which is freely rotatable on input shaft 44 and is linked with the gear train of knee joint 40 via a lost-motion coupling connecting it with a disk 53 on shaft 44, that coupling including a pin 54 on the disk engaging in a semicircular slot 55 on a hub portion of lever 52. In the cocked position of the shutter, a tongue 56 of a leaf spring 57 engages in a peripheral notch of disk 53 to immobilize same, that tongue being disengageable upon depression of the pushbutton 51 as more fully described in my copending application Ser. No. 831,265 of even date whose disclosure is likewise hereby incorporated by reference in the present application. A finger 59 on lens mount 2 comes to lie under the leaf spring 57 in the collapsed position to prevent any untimely depression thereof.

Figure 2:
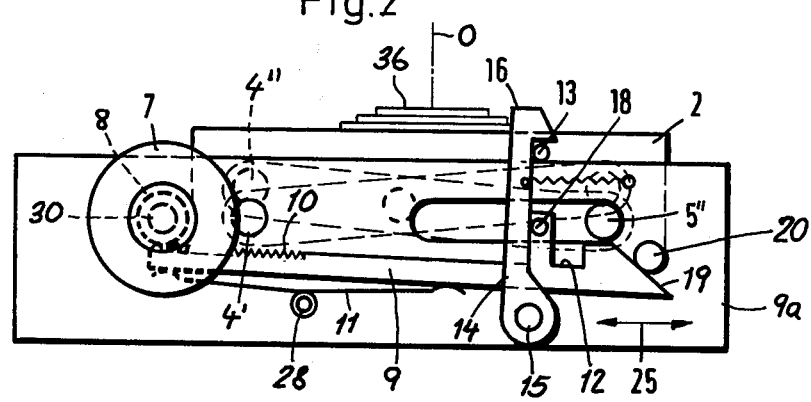
FIG. 2 is a view similar to FIG. 1 but showing the camera in its collapsed state.

Whenever the user wants to resume the taking of pictures, a clockwise rotation of knob 7 from the inoperative position of FIG. 2 to or past the indexed "infinity" position will release the latch 14 so that the lens mount 2 is re-extended, preferably by spring force, with pin 5" snapping back into the gap 12 by momentarily camming aside the prong 32 before coming to rest against prong 31.

Knob 7 (or rack 9) may be provided with a nonillustrated stop preventing its counterclockwise rotation beyond the decoupling position of FIG. 2 in which the projection 18 holds tha latch 14 substantially parallel to axis 0, i.e. in a position in which its hook-shaped extremity 16 can snap into engagement with peg 13 on lens mount 2 when the latter is retracted into the camera housing 1.

I claim:

1. A camera comprising:
   a housing adapted to receive a photographic film to be exposed;
   a lens mount provided with an objective centered on an optical axis, said lens mount being receivable in said housing in a collapsed position and being axially separable therefrom for the taking of pictures;
   a bellows forming a lighttight enclosure between said lens mount and said housing;
   an articulated linkage connecting said lens mount with said housing;
   latch means on said housing engageable with said lens mount in said collapsed position;
   focusing means on said housing engageable with said linkage for adjustably holding said lens mount separated from said housing within an operating range, said focusing means being diseangageable from said linkage upon displacement beyond said range for facilitating a retraction of said lens mount into said collapsed position;
   blocking means connected with said focusing means for disabling said latch means in said operating range, displacement of said focusing means beyond said range enabling said latch means to engage with the retracted lens mount.

2. A camera as defined in claim 1 wherein said focusing means comprises a shaft provided with an actuator, a pinion on said shaft and a rack member in mesh with said pinion, said blocking means comprising a projection on said rack member.

3. A camera as defined in claim 2 wherein said latch means comprises a swingable hook extending across said rack member into the path of said projection and spring means biasing said hook toward said projection.

4. A camera as defined in claim 2 wherein said linkage comprises a first and a second scissor arm respectively pivoted on said housing and on said lens mount, said second scissor arm having an end guided in a slot on said housing, said rack member being provided with a coupling formation engageable with a coacting formation on said second scissor arm, said rack member being laterally swingable about a point of contact with said pinion to disengage said coupling formation from said coacting formation, said housing being provided with deflecting means for laterally swinging said rack member upon movement thereof past a limiting operating position, thereby decoupling said actuator from said linkage to facilitate the retraction of said lens mount concurrently with the enablement of said latch means.

5. A camera as defined in claim 4 wherein said coupling formation comprises a pair of prongs, said projection being carried on one of said prongs.

* * * * *